US005577101A

United States Patent [19]
Böhm

[11] Patent Number: 5,577,101
[45] Date of Patent: Nov. 19, 1996

[54] TELEPOINT SYSTEM WHICH CHARGES AN ACCOUNT OF THE SUBSCRIBER RATHER CHARGING AN ACCOUNT OF THE PRIVATE BASE STATION THROUGH A CALL IS ESTABLISHED

[75] Inventor: Manfred Böhm, Stuttgart, Germany

[73] Assignee: Alcatel SEL Aktiengesellschaft, Stuttgart, Germany

[21] Appl. No.: 629,910

[22] Filed: Apr. 10, 1996

Related U.S. Application Data

[63] Continuation of Ser. No. 303,473, Sep. 9, 1994.

[30] Foreign Application Priority Data

Sep. 10, 1993 [DE] Germany .......................... 43 30 704.3

[51] Int. Cl.⁶ .............................. H04Q 7/20; H04Q 7/24; H04Q 7/26
[52] U.S. Cl. .............................. 379/58; 379/60; 379/63; 379/119; 379/121; 455/56.1
[58] Field of Search ................................. 379/57, 58, 60, 379/63, 119, 121; 455/56.1

[56] References Cited

U.S. PATENT DOCUMENTS

| | | | |
|---|---|---|---|
| 4,748,655 | 5/1988 | Thrower et al. | 379/60 |
| 4,771,448 | 9/1988 | Koohgoli et al. | 379/60 |
| 4,881,271 | 11/1989 | Yamauchi et al. | 455/56.1 |
| 4,980,907 | 12/1990 | Raith et al. . | |
| 5,003,584 | 3/1991 | Benyacar et al. | 379/119 |
| 5,202,912 | 4/1993 | Breeder et al. | 379/57 |
| 5,297,193 | 3/1994 | Bouix et al. | 379/63 |
| 5,353,331 | 10/1994 | Emery et al. | 379/58 |
| 5,359,642 | 10/1984 | Castro | 379/121 |

FOREIGN PATENT DOCUMENTS

| | | |
|---|---|---|
| 0169726 | 1/1986 | European Pat. Off. . |
| 0510630 | 10/1992 | European Pat. Off. . |
| 2250660 | 6/1992 | United Kingdom . |

OTHER PUBLICATIONS

Jansson, Swerup, Wallinder, "The Future of Cellular Telephony", Ericsson Review, 1990.
SADABA, "Personal Communications in the Intelligent Network", British Telecommunications Engineering, vol. 9, Aug. 1990.
Goodman, "Trends in Cellular and Cordless Communications" IEEE Communications Magazine, Jun. 1991.
Buckingham, Colin, et al: A Business Cordless PABX Telephone System on 800 MHz Based on the DECT Technology. In: IEEE Communications Magazine, Jan. 1991, H. 1, S. 105–110.
Mulder, R. J.: DECT, a universal cordless access system: In: Philips Telecommunication Review, Sep. 3, 1991, vol. 49, No. 3, S. 68–73.
Mobilfunk, Das Hanbuch der mobilen Sprach–, Text– und Daten–Kommunikation, Josef Kedaj and Gunther Hentschel, Neue Mediengesllschaft Ulm mbH, Feb. 1993, Chapter 7: Anwedungen des schnurlosen Telefons.
Elektrisches Nachrichtenwesen; R. Betts, M. Martin, B. Mattlet, "Telepoint auf der Basis von ISDN and intelligenten Netzen", vol. 64, No. 1, 1990, pp. 85–94.

*Primary Examiner*—William Cumming
*Attorney, Agent, or Firm*—Ware, Fressola, Van Der Sluys & Adolphson

[57] ABSTRACT

Provision of an area-covering, low-cost infrastructure for a telepoint system. Use of public telepoint base stations (TP) and private base stations (1, 2, 3). Every subscriber can make a call via any private base station or any telepoint base station.

5 Claims, 1 Drawing Sheet

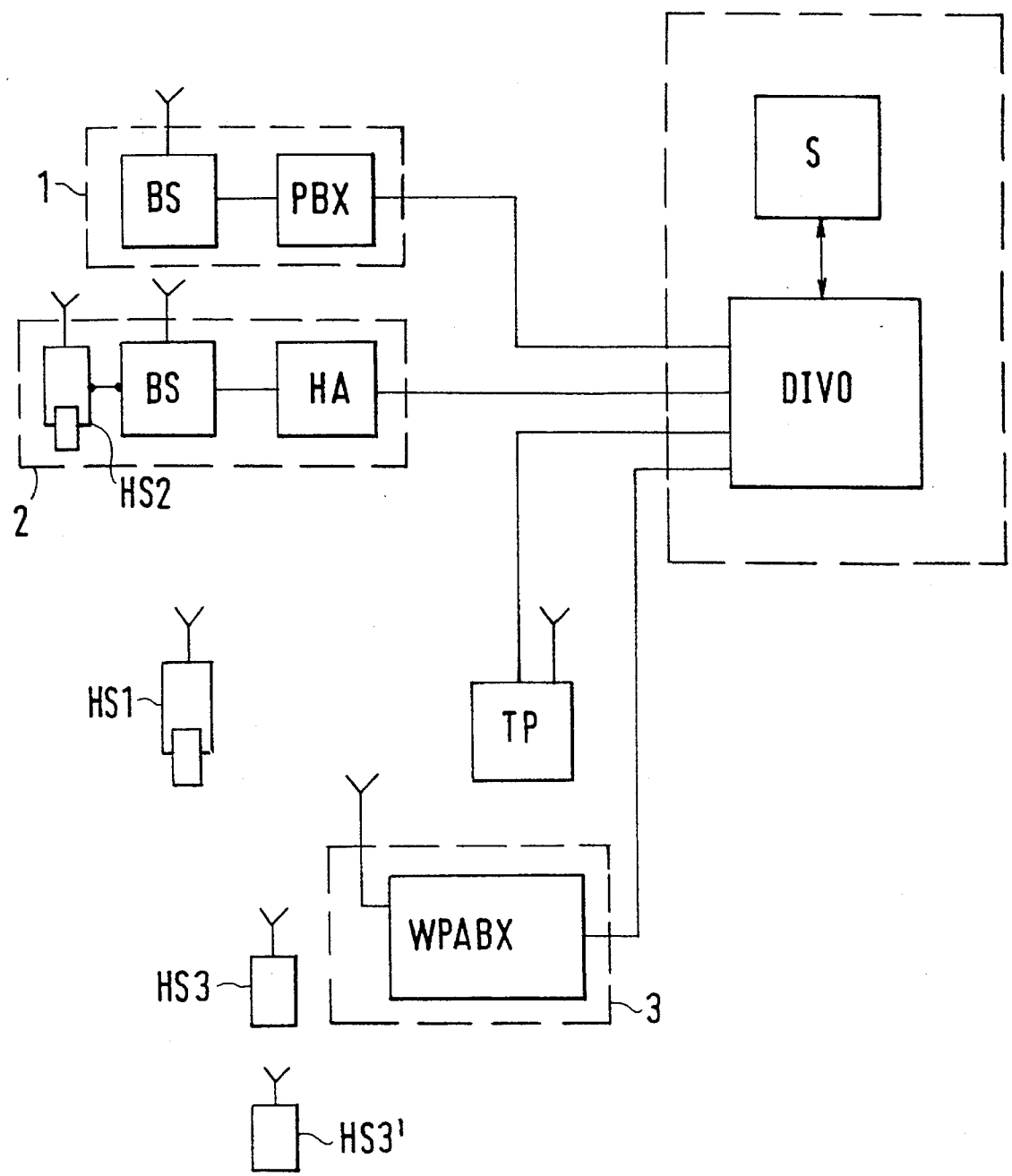

TELEPOINT SYSTEM WHICH CHARGES AN ACCOUNT OF THE SUBSCRIBER RATHER CHARGING AN ACCOUNT OF THE PRIVATE BASE STATION THROUGH A CALL IS ESTABLISHED

This application is a continuation of U.S. application Ser. No. 08/303,473 filed on Sep. 9, 1994, now abandoned.

TECHNICAL FIELD

Telepoint systems are small and low-cost "cordless" telephone systems which allow users in areas near base stations, which are installed in public places, streets, railroad stations, etc., to make calls via a radio link of several hundred meters. In the area of a private home station, the telephones used operate via the subscriber's main line, as is well known.

BACKGROUND OF THE INVENTION

Prior art telepoint systems consist of the following elements:

1. public telepoint base stations or "birdie" stations,
2. an operating and billing system, and
3. cordless terminals.

The term "birdie" is a trade name used by DBP Telekom under which a telepoint system was offered. In this system, there are so-called private mobile units which can be used to make outgoing calls. This could also be referred to as "public cordless telephone", with the base stations assigned to the network operator/service provider, and the mobile units to the users.

An important system feature of cordless telephones, namely that "a normal mobile unit understands only its own base station", makes it clear that for telepoint service, the implementation of additional methods is important (from: Mobilfunk, Das Handbuch der mobilen Sprach-, Text- und Daten-Kommunikation, Josef Kedaj and Günther Hentschel, Neue Mediengesellschaft Ulm mbH, February 1993, Chapter 7: Anwendungen des schnurlosen Telefons).

It is also known from the prior art that several network architectures can be used to implement the telepoint service. Three possible architectures are: standalone, overlay, and intelligent network based.

A specific feature of the telepoint service based on an intelligent network is the possibility of processing incoming calls. To this end, telephone subscribers interested in the service are assigned specific service numbers. In the standalone architecture, the base station is connected directly to the telephone network. In this telepoint service, however, only a negative selection can be made because of the large subscriber database, i.e., only subscribers without access authorization can be registered, which, in turn, has negative consequences for the security of the telepoint service.

In the overlay network architecture, the base stations are connected to the telephone network via front-end controllers. During caller validation, for example, the base station routes the information from the caller to the front-end controller and vice versa (Elektrisches Nachrichtenwesen; R. Betts, M. Martin, B. Mattlet: "Telepoint auf der Basis von ISDN and intelligenten Netzen"; Volume 64; Number 1, 1990; pp. 85–94).

SUMMARY OF THE INVENTION

The object of the invention is to develop a telepoint system which makes available an area-covering telepoint infrastructure.

According to the invention, the object is attained by a telepoint system comprising the following elements, which are interconnected via a telephone network: a digital exchange with a server containing means for checking subscriber identities, public telepoint base stations, and private base stations having cordless handsets permanently associated therewith, and wherein a call can be established from every cordless handset to a subscriber in the telephone network via every public telepoint base station and via every private base station not permanently associated with the respective handset by transmitting a subscriber identity from the cordless handset and checking in the server whether said subscriber identity is that of a subscriber authorized to access the telepoint system.

One advantage of the invention is that during the construction and expansion of a telepoint system, the network provider's expenditure on the infrastructure is kept low.

Since only few public telepoint base stations have to be installed by the network provider, and the remaining infrastructure is made available from individual private base stations, which are owned by private subscribers, the network provider's expenditure is reduced considerably, so that the costs to be paid by a subscriber decrease as well.

According to the invention, the cordless terminals transmit a subscriber identity which is checked by the means contained in the server. The subscriber identity of a registered cordless handset enables only authorized subscribers to telephone via the telepoint system.

According to the invention, charges for calls made via another subscriber's private base station are billed to the subscriber account of the caller's private base station. Preferably, an account of a subscriber whose private base station was used by another subscriber can be credited with a fixed amount.

According to an additional feature of the invention, the charge is also dependent on the distance between the associated private base station and the private base station from which a call was made.

According to another feature of the invention, the private base station includes means which give top priority to the use of the associated handset. These means must be present in order that an owner of a private base station to always be able to make calls from his station. In that case, only a short time delay is accepted during which the call is passed from one private base station to another private base station.

According to one other feature of the invention, the private base stations of the telepoint system may be digital wireless private automatic branch exchanges (WPABXs).

BRIEF DESCRIPTION OF THE DRAWINGS

The invention will now be explained with reference to the accompanying drawing, whose single FIGURE is a block diagram of the novel telepoint system.

BEST MODE FOR CARRYING OUT THE INVENTION

A telepoint system comprises an exchange DIVO and a server S connected thereto. The telepoint system has public telepoint base stations TP, which are installed at central locations, such as railroad stations, market places, etc.

It further includes private base stations 1, 2, 3. Each of the private base stations 1, 2, 3 has at least one cordless handset HS1, HS2, HS3, HS3' associated with it.

The individual private base stations differ in their make-ups.

One example of a private base station is given by the base station 1 of the FIGURE. It consists of a private branch exchange PBX and a base station BS connected thereto. Associated with this private base station 1 is the cordless handset HS1.

Another private base station 2 consists of a conventional telephone HA, connected to the exchange DIV0 by a subscriber line, and a base station BS connected thereto. This combination of a conventional telephone and the base station BS allows both the stationary conventional telephone and the cordless handset to be used for telephoning over one and the same line. Associated with the private base station 2 is the handset HS2.

In a further embodiment, a private base station 3 is constituted by a wireless private automatic branch exchange WPABX, which is based on, e.g., the DECT (Digital European Cordless Telephone) system. Several handsets, e.g., two, HS3 and HS3', are associated with this wireless private automatic branch exchange.

The telepoint system described is to enable subscribers to make calls from any of the handsets HS1, HS2, HS3, HS3' via any of the private base station 1, 2, 3 or any of the public telepoint base stations TP.

The private base stations 1, 2, 3 belong to a private subscriber, who also has top priority in the use of his own private base station. If a private base station is not used, however, other subscribers of the telepoint system are to be able to use that station.

The FIGURE shows that a subscriber is trying to make a call from the handset HS1, which is associated with the private base station 1, via the private base station 2 or 3 or via the telepoint base station TP.

In a first step, a search is made for an idle channel. To this end, all available channels are scanned, and if idle channels are present, a ringing signal is sent out. The transmitters connected to the idle channels respond to the ringing signal with a further signal. The channel whose transmitter has sent the strongest signal in response to the ringing signal is seized to establish the call.

To protect the telepoint system from being accessed by an unauthorized subscriber, the subscriber must be identified, e.g., before the call is made. To this end, a subscriber identity may be sent out in the form of a signal by any of the conventional methods.

The server S, which is connected to the exchange DIV0, checks whether the identity of an authorized subscriber was transmitted. The server further checks whether the identity of a subscriber using the handset is that of the subscriber associated with the private base station. If the subscriber is an authorized subscriber but is not identical with the associated subscriber, he will be authorized as a so-called nonassociated subscriber to make a call.

The call made by such a "nonassociated subscriber" must not be charged to the charge account of the associated subscriber, but it will be charged to an account of the nonassociated subscriber.

It is also possible, for example, to credit the charge account of a subscriber and owner of a private base station with a fixed amount for each use by a nonassociated subscriber. This is to encourage the owner of a private base station to voluntarily agree to make his base station available to other subscribers.

The charging may additionally be dependent on the distance between the subscriber's own private base station and the "nonassociated" base station. The resulting increased charge could, for example, be credited in part to the subscriber permitting such use.

To prevent a subscriber and owner of a private base station from being unable to use his own base station because other subscribers are occupying the channels, that subscriber must be assigned top priority. This means that the subscriber is always the first to be allocated an idle channel, and that he can hand on a nonassociated subscriber to another idle channel, thus "superseding" him. If no other channel should be idle, the connection will be released after a predetermined period of time. The release will be indicated to the nonassociated subscriber. If another idle channel is present, this connection will be established by the server.

At the telepoint base stations, none of the subscribers has priority and all subscribers are treated equally.

If use is made of wireless private automatic branch exchanges WPABX based on the DECT system, several authorized subscribers having top priority will be present in the system. This is indicated in the FIGURE by the private base station 3 with the two handsets HS3 and HS3'. Nevertheless, the two handsets are also authorized to access nonassociated private base stations, here 1 and 2, and calls are charged to a charge account of the private base station 3.

Having now disclosed the invention, what is claimed is:

1. A telepoint system comprising the following elements, which are interconnected via a telephone network: a digital exchange (DIV0) with a server (S) for checking subscriber identities, public telepoint base stations (TP), and private base stations (1, 2, 3), each having a cordless handset (HS1, HS2, HS3, HS3') and a subscriber permanently associated therewith, and wherein a call can be established from any first cordless handset (HS1) by a first subscriber to a second subscriber in the telephone network via every public telepoint base station (TP) and via every private base station (2, 3) not permanently associated with said first handset (HS1), the first subscriber known as a nonassociated subscriber with respect to said every private base station not permanently associated with said first handset, wherein said call establishment is by the first subscriber transmitting a subscriber identity from said first cordless handset (HS1) and checking in the server (S) whether the identity of the first subscriber is that of a subscriber authorized to access the telepoint system, and if said first subscriber is authorized to access the telepoint system, sharing any public telepoint base station (TP) and any private base station (2, 3) with said authorized first subscriber; and further wherein the server (S) bills the charge for a call established from said first cordless handset (HS1) by the first subscriber via the private base station (2) with which said first cordless handset (HS1) is not permanently associated, by charging an account of the first subscriber rather than charging an account of the subscriber associated with the private base station (2) through which said call is established.

2. A telepoint system as claimed in claim 1, wherein the charge is additionally dependent on the distance between the private base station (1) permanently associated with said first cordless handset (HS1) and the private base station (2) from which the call is established.

3. A telepoint system as claimed in claim 1, wherein each private base station (1, 2, 3) gives top priority to the cordless handset (HS1, HS2, HS3, HS3') permanently associated with it.

4. A telepoint system as claimed in claim 1, wherein the server (S) passes an established call to another private base station.

5. A telepoint system as claimed in claim 1, comprising private base stations (3) which are digital wireless private automatic branch exchanges (WPABX) and with each of which at least two of the cordless handsets (HS3, HS3') are permanently associated.

* * * * *